UNITED STATES PATENT OFFICE.

GADIENT ENGI, FRITZ STRAUB, AND ARMIN GROB, OF BASEL, SWITZERLAND, ASSIGNORS TO SOCIETY OF CHEMICAL INDUSTRY IN BASLE, OF BASEL, SWITZERLAND.

CHROMIUM COMPOUNDS OF AZO DYESTUFFS CONTAINING GROUPS ABLE TO BE CHROMATED, AND A PROCESS OF MAKING THE SAME.

1,221,849. Specification of Letters Patent. Patented Apr. 10, 1917.

No Drawing. Application filed July 6, 1916. Serial No. 107,804.

*To all whom it may concern:*

Be it known that we, Dr. GADIENT ENGI, FRITZ STRAUB, and Dr. ARMIN GROB, all three chemists and citizens of the Swiss Republic, and residents of Basel, Switzerland, have invented new and useful Chromium Compounds of Azo Dyestuffs Containing Groups Able to be Chromated, and a Process of Making Same, of which the following is a full, clear, and exact specification.

We have found that the chromium compounds of azo dyestuffs containing groups able to be chromated, which are very important for the production of fast tints in an acid bath, can be obtained easily by treating the said azo dyestuffs with hot alkaline solutions of chromium oxid (chromites).

The thus obtained chromium compounds of orthoazo dyestuffs constitute intense colored powders dissolving in water to intense colored solutions which do not undergo any essential change by adding sodium carbonate or soda lye and dye animal fibers in acid baths fast tints.

The carrying out of the process can be effected advantageously by treating the azo dyestuff for a long time with a hot concentrated alkaline solution of chromium oxid, diluting the mass of reaction afterward with water, boiling again for a certain time in order to achieve the reaction and to separate the chromium hydroxid in excess and isolating the new chromium compound from the solution separated by filtration from the said chromium hydroxid by adding salt to the said solution eventually after it has been acidulated. Instead of separating the chromium hydroxid in excess by diluting with water and boiling, it can be separated by neutralizing the mass of reaction with an acid.

The process is illustrated by the following examples:

Example 1: 2.5 parts by weight of the azo dyestuff derived from parachlororthodiazophenol and orthocarboxylated benzoylacetic acid are transformed into a paste with 15 parts by weight of hot water and introduced hereafter into a solution of 1.5 parts by weight of $Cr_2O_3$ (employed in the form of air dried $Cr(OH)_3$) in 20 parts by volume of soda-lye of 36° Baumé at a temperature of 70° C. The mass is then heated in the course of a short time to 110° C. and maintained at this temperature for 2 hours care being taken to stir and to prevent a change of volume. Hereby the originally blackish brown color of the mixture turns to green-black. The mass is then diluted with boiling water to 80–100 parts by volume and boiled still for a short time, whereby the solution becomes deep green. After the solution has been isolated by filtration from the separated hydrate of chromium oxid, the said solution is acidulated with acetic acid in order to separate small quantities of incompletely chromated dyestuff in form of green black flocks. By filtration the solution is liberated from this latter (which can be transformed completely by a further treatment with alkaline solutions of chromium oxid) and from this vividly green colored solution the dyestuff is precipitated by addition of common salt, eventually after the said solution has been concentrated by a smooth evaporation, and finally the dyestuff is isolated by filtration, washed and dried. The new chromium compound constitutes a deep green powder dissolving in water to green solutions which are not changed by addition of soda lye or of sodium carbonate. It dissolves in alcohol and in concentrated sulfuric acid to green solutions. It dyes animal fibers in acid baths vivid green tints showing without any subsequent treatment a very good fastness to light, washing, alkali and potting. The yield is very good.

By treating the dyestuff derived from orthodiazophenolparasulfonic acid and orthocarboxylated benzoylacetic acid according to the manner described in the foregoing example, the resulting chromium compound dyes wool in an acid bath some less pure but still more yellowish green tints of analogous properties.

Example 2: 2.5 parts by weight of the dyestuff derived from 1:2:4-diazonaphtholsulfonic acid and perinaphthindandion are transformed into a paste with 15 parts by weight of hot water and introduced into a solution of 1.5 parts by weight of $Cr_2O_3$ (employed as air dried $Cr(OH)_3$) in 20 parts by volume of soda lye of 36° Baumé at about 70° C. The dyestuff being difficultly soluble in a concentrated solution of chromite, the mass is still diluted with 15 parts of hot water and hereafter heated for 1 hour at 106 to 108° C. while stirring. The mass of reaction is then diluted with hot water to about 80-100 parts by volume and further boiled for 2 hours, whereby a deep red-brown solution results which does not change by further boiling. The solution is then separated by filtration from the chromium hydroxid in excess and neutralized with the necessary quantity of acetic acid and from the so obtained solution the chromium compound of the dyestuff is precipitated by addition of common salt, and is thus obtained with a very good yield in form of a violet-brown powder. It dissolves in water with a violet-brown coloration which is not changed on addition of sodium carbonate or of soda lye. Its solutions in alcohol and in concentrated sulfuric acid are reddish violet-brown. It dyes animal fibers in acid baths pure brown tints of excellent fastness to light, fulling and potting.

Example 3: 2.5 parts by weight of the dyestuff derived from 1:2:4-diazonaphtholsulfonic acid and betanaphthol are transformed with 5 parts by weight of hot water into a paste which is poured into a solution of 2.5 parts by weight of $Cr_2O_3$ (in form of air dried $Cr(OH)_3$) in 30 parts by volume of soda lye of 36.° Baumé at a temperature of about 60 to 70° C. while stirring. In the course of a short time the temperature is raised to 110° C. and the mass is maintained at this temperature for about 1 hour, care being taken to stir and to prevent any change of volume, whereby the originally brown red color of the solution turns quickly to blue. The mass of reaction is then diluted to 80-100 parts by volume and still boiled for some minutes, isolated by filtration from the separated chromium hydroxid, and neutralized with acetic acid and the chromium compound of the dyestuff is precipitated by addition of common salt.

It constitutes a blue powder dissolving in water with deep-blue coloration turning slightly toward red-blue on addition of sodium carbonate or of soda-lye. Its solutions in concentrated sulfuric acid and in alcohol are deep-blue. It dyes wool and silk in acid baths vivid blue tints of a very good fastness to light and fulling and of good fastness to potting.

By treating the dyestuff derived from 1:2:4-diazonaphtholsulfonic acid and alphanaphthol in an analogous manner, the resulting chromium compound furnishes blue tints still more greenish. The dyestuff derived from parachlororthodiazophenol and 1:8-dioxynaphthalene-3:6-disulfonic acid gives a chromium compound dyeing animal fibers vivid blue tints. The chromium compound of the dyestuff derived from 1:2:4-diazonaphtholsulfonic acid and metanitro-1-phenyl-3-methyl-5-pyrazolone dyes wool in an acid bath vivid blue-red tints, while the chromium compound of the dyestuff derived from diazoazobenzeneparasulfonic acid and cresotinic acid dyes animal fibers in acid baths vivid yellow-orange fast tints.

In an analogous manner can be prepared chromium compounds of the other azo dyestuffs containing groups able to be combined with chromium. The conditions of the examples can be varied within wide limits. Instead of alkali chromites, chromites of earth alkalis or other metal chromites may be employed.

What we claim is:

1. The herein described process for the manufacture of chromium compounds of azo dyestuffs containing groups able to combine with chromium, consisting in treating the said azo dyestuffs with a hot solution of a chromite.

2. As new products the described chromium compounds of azo dyestuffs constituting deep colored powders giving with water intensely colored solutions which undergo not any essential change on addition of sodium carbonate or of soda lye and dyeing animal fibers in acid baths.

In witness whereof we have hereunto signed our names this 16th day of June, 1916, in the presence of three subscribing witnesses.

Dr. GADIENT ENGI.
FRITZ STRAUB.
Dr. ARMIN GROB.

Witnesses:
PHILIP HOLLAND,
AMAND RITTER,
FRIDA SALADIN.